Dec. 27, 1960

N. E. ANDERSON 2,966,291

WIRE FEED CONTROL

Filed Dec. 16, 1955

INVENTOR
NELSON E. ANDERSON
BY H. Hume Mathews
Edmund W Bopp
ATTORNEY AND AGENT

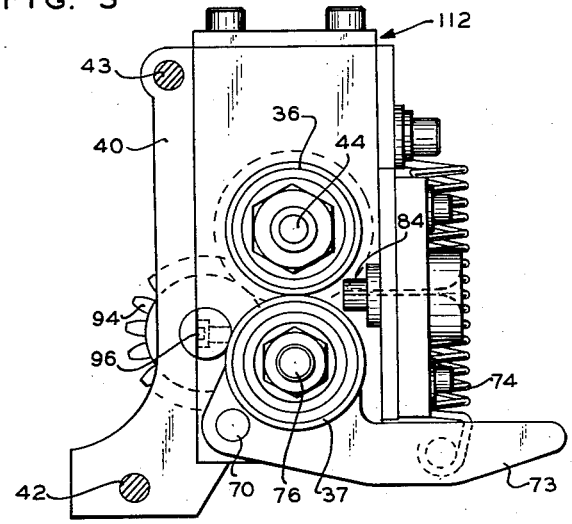
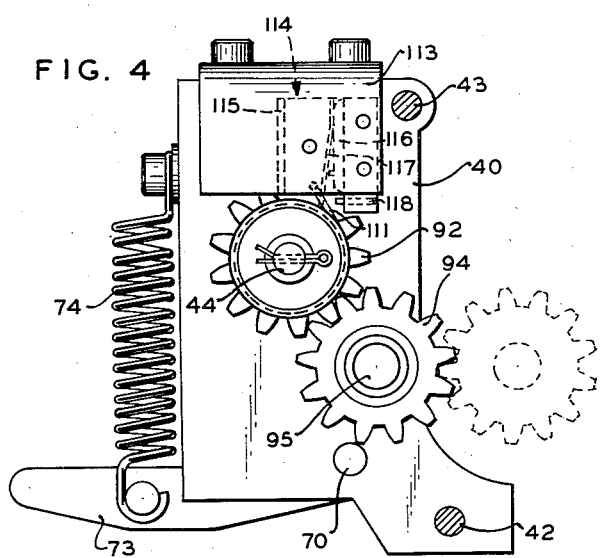

Dec. 27, 1960     N. E. ANDERSON     2,966,291
WIRE FEED CONTROL
Filed Dec. 16, 1955
3 Sheets-Sheet 3
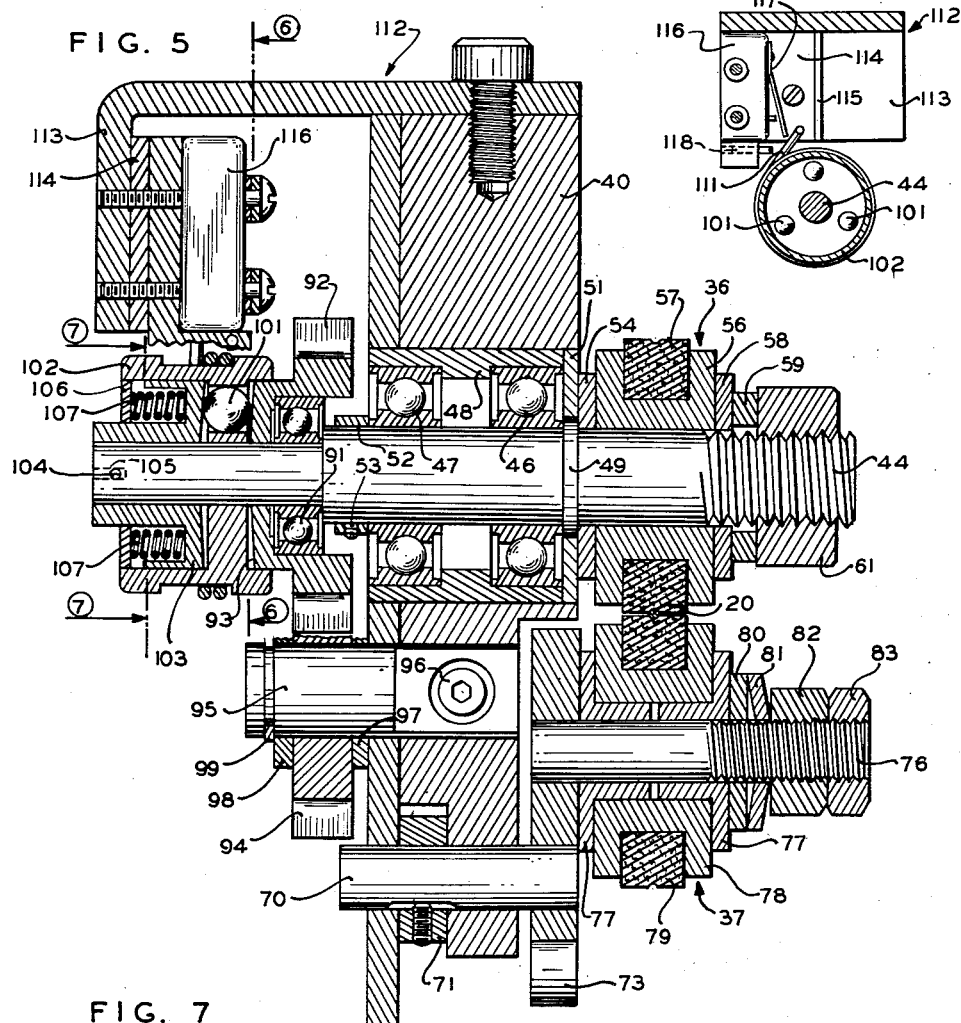
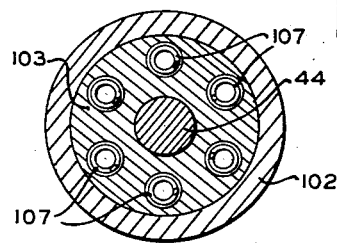
INVENTOR
NELSON E. ANDERSON
BY H. Hume Mathews
Edmund W Bopp
ATTORNEY AND AGENT United States Patent Office 2,966,291
Patented Dec. 27, 1960

2,966,291

WIRE FEED CONTROL

Nelson E. Anderson, Berkeley Heights, N.J., assignor to Air Reduction Company, Incorporated, New York, N.Y., a corporation of New York Filed Dec. 16, 1955, Ser. No. 553,543

5 Claims. (Cl. 226—2)

This invention relates to feeding control methods and apparatus for continuous filamentary materials such as wire generally, and more particularly to methods and apparatus to control the feed of electrode wire in consuming electrode metal arc welding.

There are several metal arc welding processes in which a long length of bare or lightly coated electrode wire is withdrawn from a source of supply, such as a reel, and fed by means of power driven feed rolls to an arc formed between the end of the electrode wire and the work. Under these conditions metal is transferred across the arc from the end of the electrode to the work. Welding current is introduced to the electrode wire from a contact element which may take the form of a tube or brush or roller. In high current density welding processes this contact element usually makes electrical contact with the wire near the arc end of the wire. The electrode wire is continuously fed to the arc at a rate to maintain the arc as the arc end of the electrode melts and is transferred to the work. A common difficulty with all such welding processes is that when the wire feed is interrupted or the feed rate diminished for any reason, without also interrupting or diminishing the welding current, the arc lengthens and burns back up the wire and damages the apparatus. It is not uncommon, for instance, for the electrode wire to weld itself to the contact element. This not only results in lost time and damaged equipment, but it also results in damage to the weld as a result of the excessive arc length.

An object of this invention is to provide a method and apparatus for quickly and reliably detecting improper feeding in wire feeding apparatus or the like.

Another object is to provide a method and apparatus for detecting the approach of the end of a wire or the like in a continuous feeding apparatus.

Another object is to provide a method and apparatus for instantaneously interrupting the welding current in a continuous metal arc welding process when improper feeding of the welding wire occurs.

These and other objects and advantages of the invention will be pointed out or will become apparent from the following detailed description and the accompanying drawings.

Basically this invention comprises comparing the actual wire feed speed with the speed of the wire feed means. When these speeds are in the proper relation the apparatus is functioning normally. When a discrepancy exists in the normal relationship between these speeds it is instantly and automatically detected. For a complete understanding of the invention reference should be made to the drawings and the following description.

In the drawings:

Fig. 3 is an elevational view of an enlarged scale of the slip detecting device comprising a portion of the apparatus of Fig. 2.

Fig. 4 is an elevational view also on an enlarged scale of the opposite side of the slip detecting device of Fig. 3.

Fig. 5 is a multisectional view, further enlarged, of the slip detecting device, taken through the axes of the principal shafts and pins of the apparatus to thereby enable its construction to be more clearly understood.

Fig. 6 is a sectional view taken along line 6—6 of Fig. 5.

Fig. 7 is a sectional view taken along line 7—7 of Fig. 5.

Figure 1:
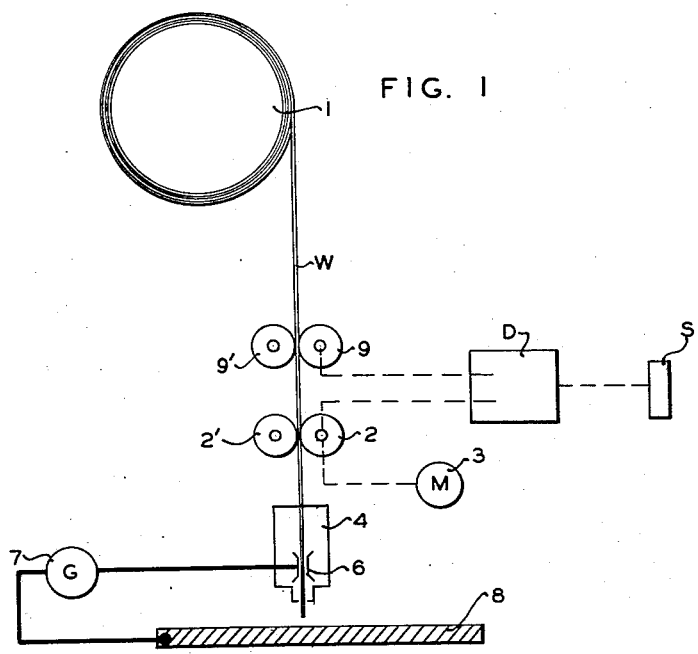
Fig. 1 illustrates schematically a simple form of the invention.

In the very simple form of the invention schematically illustrated in Fig. 1 the speed of rotation of a power driven wire feed roll is compared in a mechanical differential with the speed of rotation of a follower roll actuated by the driven wire. When the wire being fed is actually moving at the same rate as the feeding means there is no output from the differential. When the wire fails to move at the same rate as the feeding means the output of the differential is automatically employed to effect measures to prevent damage to the equipment or the work. Thus in Fig. 1 a suitable supply of wire W is represented schematically as being provided on reel 1. Feed rolls 2, 2′ driven by a motor 3 withdraw the wire from reel 1 and push it through the welding head unit depicted by the rectangle 4. Welding current is introduced to the wire through a current contact element 6 which forms part of the welding head unit. A source of welding current 7 is connected in circuit with the contact element 6 and the work 8 in the usual manner. Follower rolls 9, 9′ are supported in contact with wire W in such a manner that longitudinal translation of the wire W causes rotation of these rolls. A mechanical differential D has one input shaft directly coupled to follower roll 9 and the other input shaft directly coupled to feed roll 2. In normal operation motor 3 drives feed roll 2 which with roll 2′ grips the wire W and advances it at a rate equal to the peripheral velocity of feed roll 2. Follower rolls 9, 9′ in contact with the moving wire W, also rotate with a peripheral velocity equal to that of the drive roll 2 if there is no slippage between this drive roll and the wire. When drive roll 2 and follower roll 9 are the same diameter their angular velocities are equal. Since one input of differential D is coupled to drive roll 2 and the other input of differential D is coupled to follower roll 9 the output of the differential will reflect the sum or difference of the velocities of rotation of these two rolls. For the purposes of this invention the input to the differential is coupled in such a manner that the differential output represents the difference in the rotary speeds of drive roll 2 and follower roll 9. Thus it may be seen that when the wire is feeding normally there will be no rotation of the differential output shaft. However, if the feed roll 2 slips for any reason in its engagement with wire W, the wire will not move at a rate equal to the peripheral velocity of drive roll 2. Since follower roll 9 rotates with a peripheral velocity equal to the wire speed its rotational speed will be less than that of drive roll 2. The output shaft of differential D will then rotate at a rate related to the difference in speeds of rolls 2 and 9. This rotation may then be employed to interrupt the welding current, actuate a visual or audible signal, or stop the wire feed motor 3. Switch S represents suitable means for performing one or more of these functions. Such a mechanism not only acts when the wire feed slows down or stops because of the development of an obstruction to feeding, but it also acts when the wire supply is exhausted and the end of the wire passes through follower rolls 9, 9′, in the situation illustrated, or through whichever set of rolls is farthest upstream in the wire feeding system.

In actual practice it has been found that there is usually a slight and irregular discrepancy between the peripheral velocity of feed rolls 2 and the linear velocity of the wire being fed. This results in intermittent and non-uniform rotation of the output shaft of the differential D when the apparatus is functioning normally. It has been found that the difficulties resulting from this effect can be overcome by designing the apparatus to have a positive output in a given direction from the differential when the apparatus is functioning normally. When slippage occurs or the wire supply is exhausted, the direction of rotation of the differential output shaft is reversed. Such reversal may readily be detected by automatic apparatus. Probably the simplest way of accomplishing this is to make the follower roll 9 of smaller diameter than the drive roll 2. Under these conditions the angular velocity of follower roll 9 will be greater than that of drive roll 2 for equal peripheral velocities. When no slippage occurs this will produce rotation of the differential output shaft in one direction. When an intolerable amount of slippage occurs follower roll 9 will rotate at a slower rate than drive roll 2 and the direction of rotation of the output shaft will reverse.

Figure 2:
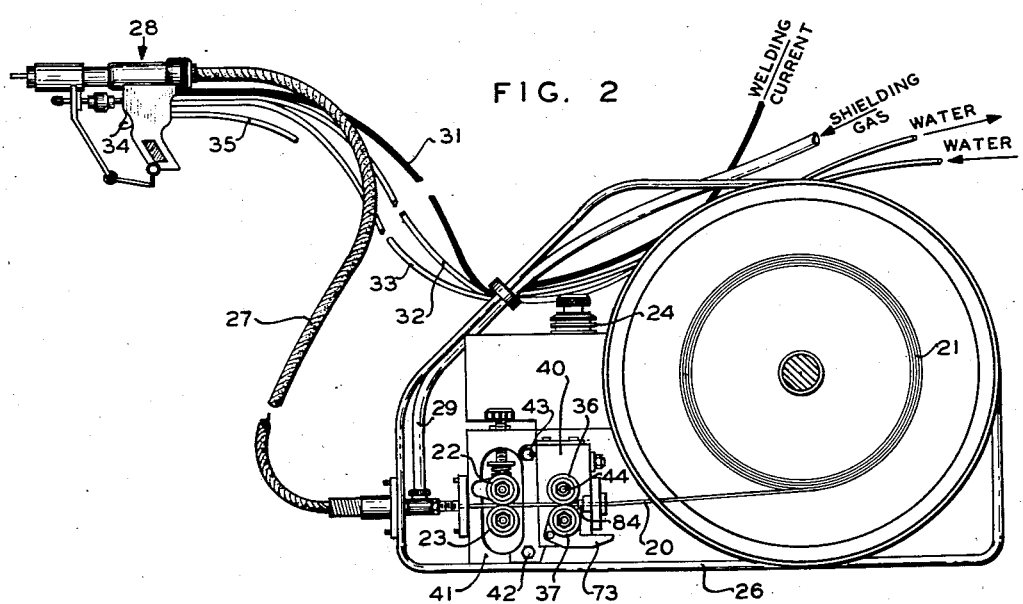
Fig. 2 illustrates the invention applied to inert gas shielded metal arc welding apparatus.

Figs. 2 through 5 illustrate modified and improved apparatus operating on the principle of the apparatus schematically illustrated in Fig. 1 and described above. In Fig. 2 the present invention is shown as applied to inert gas shielded metal arc welding of the type disclosed in Muller et al. Patent No. 2,504,868, issued April 18, 1950. Welding electrode wire 20 is withdrawn from a reel 21 by feed rolls 22, 23 which are driven by an electric motor, not shown. A governor 24, part of which is shown in Fig. 2, maintains the speed of the drive motor and the feed rolls 22, 23 at a preselected constant value when the motor is energized. The wire supply reel, the wire feed mechanism, and the novel control mechanism are all mounted in a main frame 26. The wire withdrawn from the reel is pushed through a flexible casing 27 to a welding gun 28. Further details of a suitable wire reel and feeding mechanism may be found in Anderson Patent No. 2,681,401. Welding current, shielding gas, and cooling water are supplied to the welding gun through the various conductors and conduits in the usual way. Thus the shielding gas may be provided through conduit 29 from which it passes into casing 27 and enter the welding gun from the back with the electrode wire. The welding current may be supplied by conductor 31 and the cooling water flow to and from the gun may be through conduits 32 and 33. A trigger type control switch 34 in the handle of the gun may be connected to the control circuit by control cable 35. The details of a suitable control circuit for welding apparatus of this type is fully described, in my copending application Serial No. 485,132, filed January 31, 1955, and now Patent 2,808,499, granted October 1, 1957. A welding gun of the type here illustrated is disclosed in detail in Turbett application Serial No. 269,215, filed January 31, 1952, and now Patent 2,727,970, granted December 20, 1955. The above patents as well as the Anderson patent and the Muller et al. patent previously referred to are assigned to the same assignee as the present invention.

As previously pointed out with reference to Fig. 1, the invention involves comparing the speed of the power driven wire feed rolls 22, 23 (Fig. 2) with a pair of idler or follower rolls 36, 37 that engage the wire 20. For a complete understanding of the specific mechanism employed, reference should be made to Figs. 2 through 7. The body of the speed comparing unit is a housing 40 which is secured to a fixed part 41 of the main frame 26 by bolts 42 and 43. A rotatable shaft 44 is supported in ball bearings 46 and 47 which are retained in a bearing housing 48 securely fitted into the housing 40. A collar 49 forming part of shaft 44 and a removable collar 52 held in position by set screw 53, act to prevent longitudinal motion of shaft 44. A spacer ring 51 surrounds the collar 49.

Follower roll 36 is mounted on the shaft 44 adjacent collar 49. A hardened steel washer 54 separates the roll 36 from spacer ring 51. The roll 36 may consist of a fibre tread 57 seated in a metal base 56 and is maintained in a fixed position on the shaft by a washer 58, a lock washer 59, and a nut 61, which is screwed onto threads formed on the end of the shaft 44. For some applications it is preferred to use a hardened steel tread instead of fibre, in which case the roll base is made of electrically non-conductive material.

A pivot pin 70 is mounted on the housing 40 and secured by a positioning collar 71 so that a roller arm 73 pivoted thereon may, with the aid of spring 74 apply a biasing force to the second roller 37 to urge it into contact with the wire 20 and hold the wire against roll 36. A shaft 76 extending from the roller arm 73 acts as an axle for the rotation of the follower roll 37. A split bushing 77 is fitted on the shaft 76 and the roll 37 seats loosely on the bushing. This roll 37 consists of a metal base 78 and a fiber tread 79. A washer 80, a lock washer 81, a nut 82, and a lock nut 83 complete the assembly. An insulating bushing 84 guides the wire 20 between the idler rolls 36, 37 as it is withdrawn from reel 21.

The end of shaft 44 opposite to that on which roll 36 is mounted, is of reduced diameter and a shoulder is formed on the shaft at the point at which the reduction in diameter takes place. A ball bearing assembly 91 is placed on the smaller diameter portion of the shaft in abutting relation to the shoulder formed at the point of diameter reduction of the shaft. An offset spur gear 92 is mounted on bearing 91 for free rotation in either direction on shaft 44. The face 93 of the gear 92 is slightly conical having a one and one half degree bevel on its forward surface, i.e. the face 93 forms an angle of 91.5° with respect to the surface of shaft 44.

Gear 92, which constitutes one input to a differential, engages another spur gear 94 idly mounted on a shaft 95 which is secured to the housing 40 by a screw 96 passing through an appropriate hole in a flattened position of the shaft near its one end. Idler gear 94 is maintained in position on shaft 95 by spacer washers 97, 98, and a snap ring 99 which fits a recess on shaft 95. Idler gear 94 not only engages spur gear 92, but it also engages another spur gear mounted on the same shaft as feed roll 23. This gear, shown in phantom in Fig. 4 is driven by the wire feed motor and its speed of rotation is always necessarily identical to the speed of rotation of feed roll 23.

Three steel balls 101 are mounted symmetrically in a differential ball cage 102 in contact with the beveled forward surface 93 of the gear 92. These balls are sustained in position by the action of a differential thrust plate 103, which is also beveled one and one half degrees so that its surface is parallel to the face 93 of gear 92.

The thrust plate 103 has a cylindrical hub and is free to slide longitudinally on shaft 44 within given limits but rotation with respect to the shaft is prevented by a cotter pin 104 which protrudes from the shaft 44 through slots 105 in the cylindrical hub portion of the differential thrust plate unit. A thrust plate washer 106 restrained from motion longitudinally of the shaft 44 by the projecting portions of pin 104 provides backing for six coil springs 107 which bear against the back of the thrust plate to maintain rolling contact between the face of the thrust plate 103, the balls 101, and the face 93 of gear 92.

The rotation of gear 92, resulting from rotation of the driven feed roll 23, constitutes one input to the differential. The rotation of shaft 44, and hence thrust plate 103 constitutes the second input to the differential.

The rotation of the ball cage 102 constitutes the differential output.

The one and one half degrees parallel beveled surfaces of spur gear 92 and thrust plate 103 with the steel balls 101 mounted therebetween produce a small output rotation of the differential ball cage 102 when the rotational velocities of input gear 92 and input shaft 44 are equal and in opposite directions. This is because the forward beveled surface 93 of gear 92 engages balls 101 below their horizontal center lines and the hollow beveled surface of thrust plate 103 engages these balls above their horizontal center lines so that the radius and hence the circumference of the circle generated by the contact of balls 101 and thrust plate 103 is greater than the circumference of the circle generated by the contact of balls 101 and the face 93 of gear 92. This difference in contact circumferences is responsible for the creating of an output rotation of the ball cage when the two inputs to the differential are equal and opposite. With this system the wire feed rolls 22, 23 and the follower rolls 36, 37 may be the same standard size and interchangeable.

The speed of rotation of gear 92 is unalterably related to the speed of rotation of the power driven feed rolls 22, 23. However, if these feed rolls fail to grip the wire 20 securely, or if the wire feed is obstructed, slippage occurs. The wire 20 is then necessarily traveling at a reduced linear speed which is reflected in the speed of rotation of follower rolls 36, 37 and consequently is reflected in the speed of rotation of the differential thrust plate 103. The reduced speed of these elements tends to produce rotation of the ball cage in a direction opposite to that inherently produced by the tapered face plates of the differential. Thus a mechanism is provided which produces rotation of the ball cage in a given direction under normal operating conditions and rotation of the ball cage in the opposite direction when excessive slippage occurs.

The change in direction of rotation of the ball cage is employed to actuate an electric switch when slipping of the feed rolls on the wire occurs. This is accomplished by means of a helical spring 111 surrounding an appropriate portion of the outer surface of the ball cage 102. This spring is wound to a diameter which fits the ball cage snugly. The direction of the helix is such that when the ball cage rotates in the direction resulting from normal operation of the apparatus the frictional drag between the spring and the ball cage tends to open the helix and increase its diameter permitting the ball cage to rotate within the spring. A free end of the spring bears against a fixed stop preventing rotation of the spring with the ball cage. When the ball cage rotates in the opposite direction, i.e. the direction resulting from slippage, the frictional traction between the spring and ball cage tends to tighten the spring on the cage and cause it to rotate with the ball cage. This action causes the free end of the spring to trip a micro switch mounted above the ball cage. The specific construction of the micro switch and its support as well as the relation of the switch to the free end of spring 74 is as follows. An L-shaped switch support bracket 112 is affixed to the topmost surface of the housing 40. Leg 113 of the support bracket 112 extends downwardly toward the differential ball cage 102. A clutch release bracket 114, also L-shaped, is attached to depending leg 113 of the switch support bracket. The short leg 115 acts as a stop for the clutch spring 111 when the rotation of the differential ball cage 102 is such that the spring is maintained in an open position. A micro switch 116 is also attached to depending leg 113 of the switch support bracket in such a manner that the switch actuating arm 117 projects into the path of the free end of clutch spring 111. An adjustable overtravel stop pin 118 is mounted behind the micro switch actuating arm 117. When slippage in the feed of the wire 20 is detected, the rotation of the differential ball cage 102 changes direction, thereby binding the clutch spring 111 and causing it to trip the micro switch 116. In the preferred form of the invention the micro switch is connected in the wire feed motor circuit as well as the actuating circuit of the welding contactor to thereby automatically interrupt the wire feed and the welding current when the switch is actuated. After the tripping of the micro switch 116, further rotation of the clutch spring 111 is prevented by the stop pin 118, although continued movement of the ball cage is possible.

It will be evident that as a result of this invention it has been made possible to surely and automatically detect imperfect feeding or exhaustion of the supply of wire or like filamentary material through a power driven feeding apparatus. It is understood that the invention is not limited to the particular form shown and described but may be used in other ways without departure from its spirit as defined by the following claims.

I claim:

1. A method of detecting a predetermined difference between the velocity of the peripheral surface of a power driven feed roll and the longitudinal velocity of a filament engaging said peripheral surface of said feed roll and fed thereby which comprises developing a first angular velocity related to the peripheral velocity of said power driven feed roll, developing a second angular velocity related to the longitudinal velocity at which said filament is moving relative to said feed roll, comparing the said first and second angular velocities in a differential to obtain therefrom an output motion, and establishing a relationship between said first and second angular velocities such that the output of said differential reverses in direction as the difference between the peripheral velocity of said power driven feed roll and the longitudinal velocity of said filament changes from some value less than a predetermined value to some value greater than said predetermined value.

2. In an apparatus for feeding a filamentary material by means of a power driven feed roll having its peripheral surface in driving engagement with said filament, the improvement which comprises means for developing a first angular velocity related to the peripheral velocity of the said power driven feed roll, means for developing a second angular velocity related to the longitudinal velocity at which said filament is moving relative to said feed roll, differential means for comparing the said first and second angular velocities and to obtain therefrom an output motion related to the difference between said first and second angular velocities, and means for causing the output motion of said differential to reverse in direction as the peripheral velocity of said power driven feed roll increases with respect to the longitudinal velocity of said filament from some value less than a predetermined amount above said filament velocity to some value greater than said predetermined amount above said filament velocity.

3. Apparatus according to claim 2 in which there is an electric switch and means responsive only to a reversal in the direction of the output motion of the differential for actuating said electric switch.

4. Wire feeding apparatus for electric arc welding of the type in which an arc is formed between a wire electrode and a work-piece and metal is transferred across said arc from said electrode to said workpiece which comprises means for withdrawing wire from a source of wire and feeding it to a point remote from said source, said withdrawing and feeding means including a wire feed motor and a wire feed roll actuated by said motor and having its periphery in driving engagement with said wire, a follower roll having its periphery in operative engagement with and driven by said wire whereby longitudinal translation of said wire causes rotation of said follower roll in accordance with the feeding rate of said wire at said feed roll, a mechanical differential having two means for receiving rotary input motion and a means for delivering rotary output motion, means for coupling the rotation of said feed roll to one input means of said differential, means for coupling the rotation of said follower roll to the other input means of said differential, an electric switch, and means responsive only to rotation in a predetermined direction of said output means of said differential for operating said switch.

5. Apparatus according to claim 4 wherein both said coupling means and said differential constitute a mechanism in which the rotational output of the differential is in a given direction when the peripheral velocities of the feed roll and the follower roll are substantially equal and in which the rotational output of the differential is in the opposite direction when the peripheral velocity of the feed roll exceeds the peripheral velocity of the follower roll by a predetermined amount.

References Cited in the file of this patent

UNITED STATES PATENTS

| | | |
|---|---|---|
| 2,175,551 | Perry | Oct. 10, 1939 |
| 2,442,336 | Bauer | June 1, 1948 |
| 2,491,228 | Swift | Dec. 13, 1949 |
| 2,719,245 | Anderson | Sept. 27, 1955 |

FOREIGN PATENTS

| | | |
|---|---|---|
| 349,804 | Germany | Mar. 8, 1922 |